(12) United States Patent
Kashitsyn et al.

(10) Patent No.: US 11,201,892 B1
(45) Date of Patent: Dec. 14, 2021

(54) ENHANCED CRAWLING OF UNEXPOSED WEB APPLICATIONS

(71) Applicant: Rapid7, Inc., Boston, MA (US)

(72) Inventors: Dmitriy Kashitsyn, Yorba Linda, CA (US); Andrew Tisdale, Huntington Beach, CA (US); Jijo John, London (CA)

(73) Assignee: Rapid7, Inc., Boston, MA (US)

( * ) Notice: Subject to any disclaimer, the term of this patent is extended or adjusted under 35 U.S.C. 154(b) by 221 days.

(21) Appl. No.: 16/564,029

(22) Filed: Sep. 9, 2019

Related U.S. Application Data

(63) Continuation of application No. 16/545,044, filed on Aug. 20, 2019.

(51) Int. Cl.
*H04L 29/06* (2006.01)

(52) U.S. Cl.
CPC ...... *H04L 63/1433* (2013.01); *H04L 63/1408* (2013.01)

(58) Field of Classification Search
CPC .......................... H04L 63/1433; H04L 63/1408
See application file for complete search history.

(56) References Cited

U.S. PATENT DOCUMENTS

| | | | | |
|---|---|---|---|---|
| 10,152,552 | B2* | 12/2018 | Simpson | G06F 8/38 |
| 10,637,881 | B2* | 4/2020 | Williams | G06F 21/566 |
| 10,747,881 | B1* | 8/2020 | Luo | H04L 63/1491 |
| 2002/0010855 | A1* | 1/2002 | Reshef | G06F 21/554 |
| | | | | 713/164 |
| 2013/0066848 | A1* | 3/2013 | Tuttle | G06F 16/951 |
| | | | | 707/711 |
| 2014/0173744 | A1* | 6/2014 | Borohovski | H04L 63/1433 |
| | | | | 726/25 |
| 2017/0308513 | A1* | 10/2017 | Hunt | G06F 40/143 |

* cited by examiner

*Primary Examiner* — Izunna Okeke
(74) *Attorney, Agent, or Firm* — Ashwin Anand

(57) ABSTRACT

Techniques are disclosed for enhanced crawling of unexposed web applications for vulnerability scanning purposes. A response to a request to a web application is received and a web application framework detection routine is executed on the response. A determination is made that a web application framework is part of the response and the response is loaded in a web browser associated with the web application. A custom web application framework hook for the web application framework is injected into a web page of a web browser and a list of Document Object Model (DOM) elements and corresponding event handlers is received. A determination is made, based on the list, to execute DOM events to discover functionality of the web application. The DOM events are executed, and network activity of the web browser during execution of the DOM events is recorded.

18 Claims, 13 Drawing Sheets

| Unexposed Web Application Security Table 305 | | | | | |
|---|---|---|---|---|---|
| Client Field 310 | Web Application Field 315 | Framework Field 320 | Common Events Field 325 | Elements Field 330 | Events Field 335 |
| 140(1) | 145(1) | React | 225(1)-(5) | 215(1)-(10) | 225(1)-(3) |
| | 145(2) | Angular | 225(6)-(10) | 215(4)-(7) | 225(7)-(8) |
| 140(2) | 145(3) | Vue | 225(1)-(7) | 215(1)-(5) | 225(2)-(3) |
| | 145(4) | Ember | 225(2)-(6) | 215(4)-(9) | 225(3)-(6) |
| • • • | • • • | • • • | • • • | • • • | • • • |

ENHANCED CRAWLING OF UNEXPOSED WEB APPLICATIONS

CROSS-REFERENCE TO RELATED APPLICATIONS

The present application claims the benefit and is a Continuation of U.S. Utility patent application Ser. No. 16/545,044 filed on Aug. 20, 2019 titled "Scanning Unexposed Web Applications for Vulnerabilities," the disclosure of which is incorporated by reference as if set forth in its entirety herein.

BACKGROUND

Field of the Disclosure

This disclosure is related to web application security. In particular, this disclosure is related to the enhanced crawling of unexposed web applications.

Description of the Related Art

A software framework is an abstraction in which software that provides generic functionality can be selectively modified by additional user-written code, thus generating application-specific software, and can include support programs, compilers, code libraries, tool sets, and application programming interfaces (APIs) that facilitate application development. Modern software frameworks (e.g., React, Angular, Vue, Ember, and the like) provide a standard methodology to build and deploy applications (e.g., web applications, and the like). Such modern frameworks are each unique and include their own feature sets, thus adding a layer of complexity on top of traditional web application design techniques.

Given the heightened security threat to mission critical software applications deployed on the web from hackers and other malicious actors and/or entities, software applications developed using such aforementioned frameworks are often subjected to rigorous security-based testing operations (e.g., to test for security vulnerabilities, and the like). For example, web application security testing tools employ (and rely on) application scanners to crawl web applications to unearth security vulnerabilities.

Crawling web applications to discover security vulnerabilities requires visibility into how these frameworks operate. For example, for an application scanner to evaluate a given web application for security vulnerabilities, the application scanner typically executes network requests associated with the website's elements (e.g., text, images, links, and the like). Unfortunately, events attached to elements in web applications built with the aforementioned modern frameworks are not visible to application scanners (e.g., because of the runtime generation of such elements, security features provided for a given framework, and the like). What's more, conventional methods of web application discovery are not suited to crawl such web applications.

SUMMARY OF THE DISCLOSURE

Disclosed herein are methods, systems, and processes for scanning unexposed web applications for (security) vulnerabilities. One such method involves executing a web application framework detection routine to detect a web application framework associated with a web application, injecting a custom web application framework hook for the web application generated with the web application framework, receiving Document Object Model (DOM) elements and DOM events, determining one or more DOM events to be executed, executing the one or more DOM events, and recording network activity during execution of the one or more DOM events.

In one embodiment, the method involves receiving a response to a request generated to the web application, determining that the web application framework is part of the response, and loading the response in a web browser executing the web application.

In another embodiment, the custom web application framework hook for the web application framework is injected into a web page of the web browser and the DOM events are executed to discover functionality of the web application.

In some embodiments, the custom web application framework hook causes the web browser to load the response with the custom web application framework hook for the web application framework if the web application framework is part of the response.

In other embodiments, the response is a Hypertext Markup Language (HTML) content type and the detection of the web application framework is based on regular expressions.

In certain embodiments, the custom web application framework hook causes a function in the custom web application framework hook to interact with the web application framework used to build the web page to create an enumeration of the DOM elements and the DOM events, and the function is executed after a delay to ensure setup procedures associated with the web application framework are complete.

In one embodiment, the method involves creating a global list of a plurality of DOM elements and a plurality of corresponding DOM events associated with the web page and identifying, using the global list, an order in which to execute one or more DOM events of the plurality of DOM events to discover the functionality of the web application.

In another embodiment, discovering the functionality of the web application comprises discovering new Uniform Resource Locators (URLs), new web application states, and generation of new requests in the web application and the execution of the one or more DOM events is based on one or more criteria comprising at least a uniqueness of the plurality of DOM elements and the plurality of DOM events and a plurality of repetition tolerance configuration values.

In certain embodiments, the method involves retrieving an updated list of DOM elements and DOM events from the custom web application framework hook after executing the one or more DOM events, adding new DOM events to a DOM events queue for processing, and performing a DOM discovery loop until one or more remaining DOM events are processed or a scan configuration limit is reached.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is a table 300 that illustrates an unexposed web application security table, according to one embodiment of the present disclosure.

Figure 1:
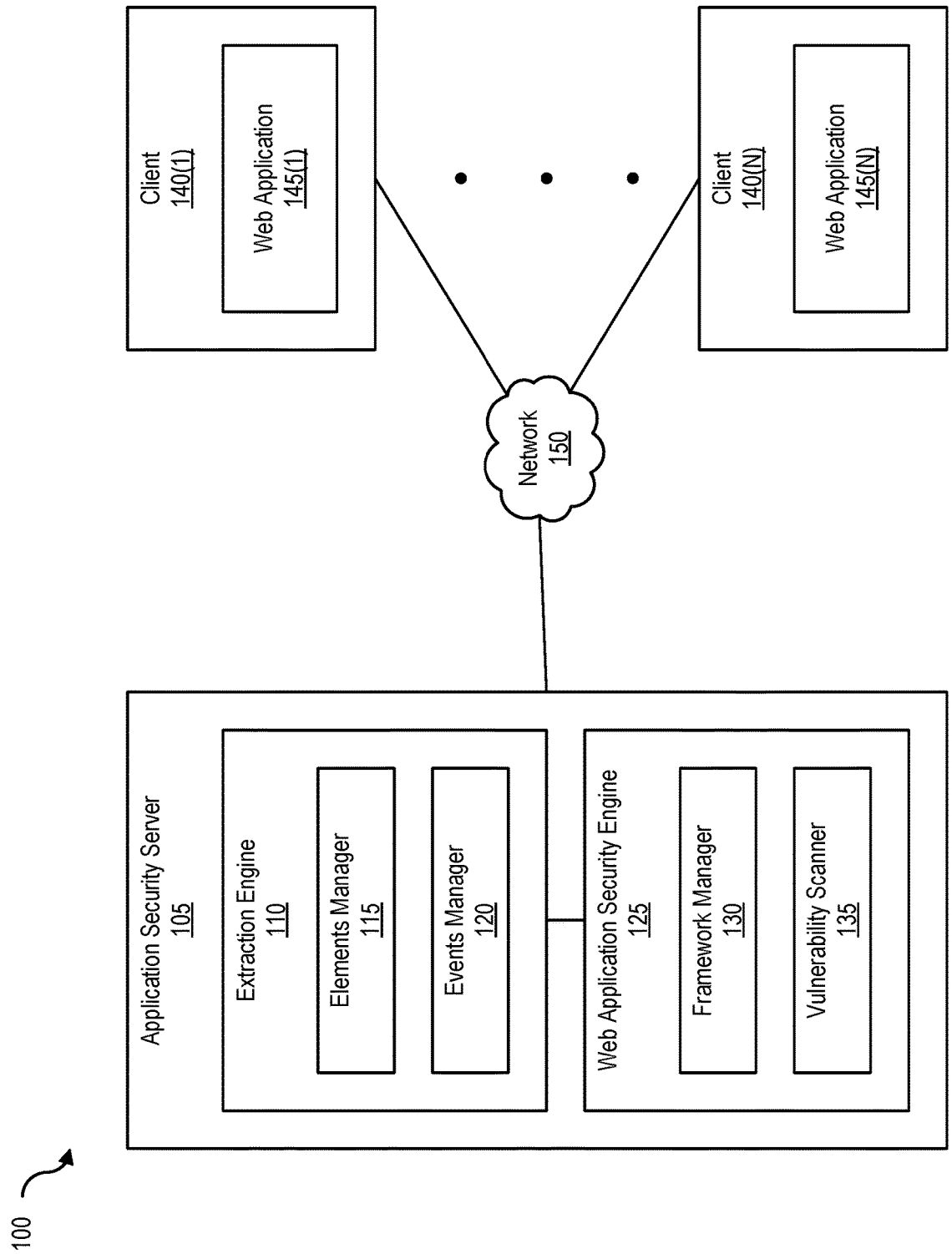
FIG. 1 is a block diagram 100 of an application security server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Web application vulnerability testing requires the discovery and crawling of a web application prior to executing tests designed to identify vulnerabilities in the web application. It is critical then that the web application discovery be thorough. For example, if a section of a web application of even the whole web application is not discovered and crawled, that (particular) section can remain hidden from vulnerability checking, thus preventing the section from being checked for security problems. The comprehensive enumeration of entry points into the web application is an important requirement for a web security analysis of the target web application.

In modern cybersecurity computing environments, protecting mission critical web applications deployed over the Internet from malicious security threats and vulnerabilities is of paramount importance to business, enterprises, and organizations. Many modern web applications are created and deployed using software frameworks (e.g., JavaScript frameworks such as React.js, AngularJS, Vue.js, Ember.js, and the like). Unfortunately, web applications created and deployed using such foregoing JavaScript frameworks are not conducive to necessary application vulnerability scanning operations.

A Document Object Model (DOM) is a cross-platform and language-independent interface that treats Extensible Markup Language (XML) or Hypertext Markup Language (HTML) documents as a tree structure where each node is an object that represents part of the document. Because of the shortcomings of relying on traditional DOM Application Programming Interfaces (APIs) to frequently create and update websites as is typically done in modern web applications, the aforementioned JavaScript frameworks utilize a lightweight abstraction methodology called Virtual DOM (or Shadow DOM) that is runtime generated to synchronize data with an user interface of a web application without refreshing the entire web application.

Modern web applications typically include elements and (potential) corresponding events (e.g., presented in a website or webpage format). An element in a web application can include text, images, buttons, links, fields, inputs, and the like. An event in a web application can include an action (manual or automated) that is performed on (or in association with) an element (e.g., a click event on a link, a mouseover event on an image, and the like).

Unfortunately, existing application scanners are unable to crawl web applications created using such aforementioned JavaScript frameworks for security vulnerabilities at least because events attached to DOM elements are not visible for applications scanners to crawl and attack because of the runtime (and real time) generation of the DOM elements and/or the (built-in) security features provided by developers (or the community) for the (given) JavaScript framework (e.g., unexposed events).

Therefore, provisioned security features and/or the real time nature of modern web applications (where DOM elements are generated at runtime) prevents an application scanner (e.g., AppSpider® developed and provided by Rapid7®, Inc.) from determining corresponding events associated with the DOM elements. Because the application scanner attacks a website (e.g., to check for security vulnerabilities) by executing events from the website and recording network traffic originating from the execution of the events, the application scanner cannot perform such attack operations for vulnerability determination because the application scanner cannot identify corresponding events attached to (or associated with) the DOM elements.

Disclosed herein are methods, systems, and processes for the enhanced crawling of unexposed web applications.

Example Security Server for Scanning Unexposed Web Applications

FIG. 1 is a block diagram 100 of an application security server 105, according to one embodiment. Application security server 105, which can be any type of physical or virtual computing device, includes at least an extraction engine 110 with an elements manager 115 and an events manager 120, and a web application security engine 125 with a framework manager 130 and a vulnerability scanner 135. Application security server 105 is communicatively coupled to clients 140(1)-(N) via network 150, which can be any type of network or interconnection. Clients 140(1)-(N) (e.g., virtual machines or physical computing devices) each host and execute at least one web application (e.g., web applications 145(1)-(N) as shown in FIG. 1).

In one embodiment, web applications 145(1)-(N) are unexposed web applications that are each created, generated, developed, or deployed with software development frameworks that do not expose actionable events associated with the elements in the Document Object Model (DOM) of the given web application (e.g., Angular, React, Vue, Ember, and the like). Therefore, in certain embodiments, to scan unexposed web applications for security vulnerabilities, application security server 105 accesses web application 145(1) executing on client 140(1). In this example, elements manager 115 determines that elements in a DOM of web application 145(1) are completely loaded and events manager 120 performs a brute force operation to identify unexposed actionable events associated with the elements in the DOM.

In some embodiments, the brute force operation discussed with respect to the foregoing example(s) is based on a list of common actionable events associated with a web application framework that is used to create web application 145(1). The brute force operation identifies (one or more) unexposed actionable events associated with elements in the DOM by skipping unexposed actionable events not in the list of common actionable events associated with the web application framework used to create web application 145(1) (e.g., a first web application framework). Application security server 105 then receives the unexposed actionable events identified as part of performing the brute force operation from client 140(1) and web application security engine 125 scans web application 145(1) for security vulnerabilities based on the unexposed actionable events using vulnerability scanner 135.

As noted, web application 145(1) is created using a first web application framework (e.g., React.js) and the first web application framework does not expose actionable events associated with the elements in the DOM of web application 145(1). Therefore, to scan such unexposed web applications for vulnerabilities, web application security engine 125 generates a first scanning package and transmits the first scanning package that corresponds (only) to the first web application framework to web application 145(1). The first scanning package includes a list of one or more actionable events that are unique to and/or frequently encountered with respect to the first web application framework (e.g., for performing brute force operations to extract unexposed actionable events from web application 145(1)).

Similarly, web application security engine 125 can also generate a second scanning package and transmit the second scanning package that corresponds (only) to a second (or another) web application framework (e.g., Ember.js) to web application 145(2). The second scanning package includes a list of one or more actionable events that are unique to and/or frequently encountered with respect to the second web application framework (e.g., for performing brute force operations to extract unexposed actionable events from web application 145(2)). In this manner, framework manager 130 that is part of web application security engine 125 can generate unique scanning packages for each web application depending on the type of web application framework that is used to create or generate the given web application. In one embodiment, scanning a given web application for security vulnerabilities is based on analyzing a captured network request associated with one or more unexposed actionable events.

Example of Extracting Unexposed Events for Vulnerability Scanning

Figure 2:
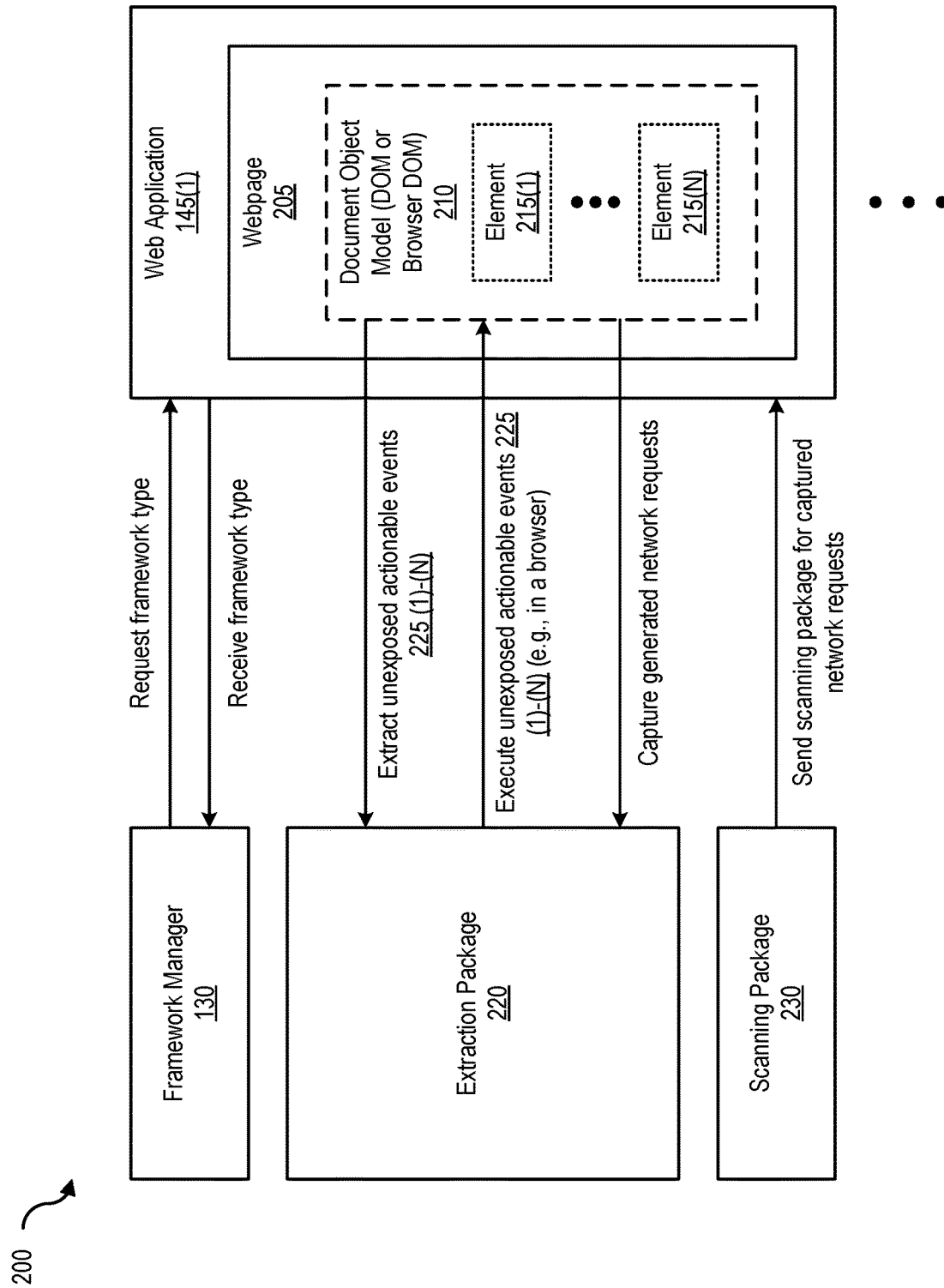
FIG. 2 is a block diagram 200 of an extraction package and a scanning package, according to one embodiment of the present disclosure.

FIG. 2 is a block diagram 200 of an extraction package and a scanning package, according to one embodiment. In one embodiment, framework manager 130 requests a framework type from web application 145(1) and receives the framework type from web application 145(1) (e.g., Vue.js or Ember.js). Based on the received framework type, extraction package 220 extracts unexposed actionable events 225 (1)-(N) from DOM 210 (with elements 215(1)-(N)) of a webpage 205 and webpage 205 executes unexposed actionable events 225(1)-(N) (e.g., in a browser). Extraction package 220 then captures the generated network requests and a scanning package 230 (customized to the framework type for web application 145(1)) is sent for the captured network requests (e.g., to scan for vulnerabilities).

In certain embodiments, extraction package 220 accesses and monitors rapidly (or frequently) changing DOM elements and provides accurate information regarding the DOM elements to web application security engine 125. In this example, extraction package 220 is executed with various other scripts in webpage 205 (e.g., as part of webpage 205). In some embodiments, extraction package 220 provides hidden events attached to generated DOM elements by brute forcing common events associated with the given framework (e.g., the framework type requested and received by framework manager 130). Therefore, application security server 105 not only increases DOM coverage but also provides DOM events of DOM elements to vulnerability scanner 135 for further crawling and attacking of security vulnerabilities in web application 145(1) built with a framework that does not expose actionable events.

Example Unexposed Web Application Security Table

FIG. 3 is a table 300 that illustrates an unexposed web application security table 305, according to one embodiment. Unexposed web application security table 305, includes at least a client field 310, a web application field 315, a framework field 320, a common events field 325, an elements field 330, and an events field 335. Client 140(1) hosts and/or executes web applications 145(1) and 145(2) which are created using different frameworks—for example, React.js and AngularJS, respectively. As previously noted, scanning web applications created using different and disparate JavaScript frameworks that do not expose actionable DOM events is a challenging technological problem.

In one embodiment, because framework manager 130 requests, receives, and manages disparate framework types that are used to create, develop, or generate one or more disparate web applications (e.g., web application 145(1) created using React.js), extraction engine 110 can use unexposed actionable events 225(1)-(5) in common events field 325 that include common (or frequently used) DOM events exclusively associated with React.js to brute force and extract unexposed actionable events 225(1)-(3) associated with elements 215(1)-(10) to provide to web application security engine 125 for generating a scanning package that can be used by vulnerability scanner 135 to scan web application 145(1) for security vulnerabilities associated with network requests only tied to unexposed actionable events 225(1)-(3) (while not wasting expensive computing resources redundantly scanning events 225(4)-(5)).

In another embodiment, because framework manager 130 requests, receives, and manages disparate framework types that are used to create, develop, or generate one or more disparate web applications (e.g., web application 145(2) created using AngularJS), extraction engine 110 can use unexposed actionable events 225(6)-(10) in common events field 325 that include common (or frequently used) DOM events exclusively associated with AngularJS to brute force and extract unexposed actionable events 225(7)-(8) associated with elements 215(4)-(7) to provide to web application security engine 125 for generating a scanning package that can be used by vulnerability scanner 135 to scan web application 145(2) for security vulnerabilities associated with network requests only tied to unexposed actionable events 225(7)-(8) (while preventing the redundant scanning of events 225(6) and 225(9)-(10)).

In some embodiments, because framework manager 130 requests, receives, and manages disparate framework types that are used to create, develop, or generate one or more disparate web applications (e.g., web application 145(3) created using Vue s), extraction engine 110 can use unexposed actionable events 225(1)-(7) in common events field 325 that include common (or frequently used) DOM events exclusively associated with Vue.js to brute force and extract unexposed actionable events 225(2)-(3) associated with elements 215(1)-(5) to provide to web application security engine 125 for generating a scanning package that can be used by vulnerability scanner 135 to scan web application 145(3) for security vulnerabilities associated with network requests only tied to unexposed actionable events 225(2)-(3) (while preventing the redundant scanning of events 225(1) and 225(4)-(7)).

In other embodiments, because framework manager 130 requests, receives, and manages disparate framework types that are used to create, develop, or generate one or more disparate web applications (e.g., web application 145(4) created using Ember.js), extraction engine 110 can use unexposed actionable events 225(2)-(6) in common events field 325 that include common (or frequently used) DOM events exclusively associated with Ember.js to brute force and extract unexposed actionable events 225(3)-(6) associated with elements 215(4)-(9) to provide to web application security engine 125 for generating a scanning package that can be used by vulnerability scanner 135 to scan web application 145(4) for security vulnerabilities associated with network requests only tied to unexposed actionable events 225(3)-(6) (while preventing the redundant scanning of event 225(2)).

Therefore, extraction engine 110 and web application security engine 125 in application security server 105 not only expose previously unexposed actionable events in disparate software development frameworks for vulnerability scanning, but also do so in a manner such that expensive computing resources in modern cybersecurity computing environments can be used to efficiently scan highly responsive or common DOM events from DOM elements, while skipping the redundant scanning of uncommon or sparsely used DOM events—thus, not only increasing DOM coverage for security scanning, but also providing DOM events of DOM elements to an application scanner for further crawling and attacking of vulnerabilities that may present in a given web application built with a particular framework.

Example Processes for Scanning Unexposed Web Applications for Vulnerabilities

Figure 4:
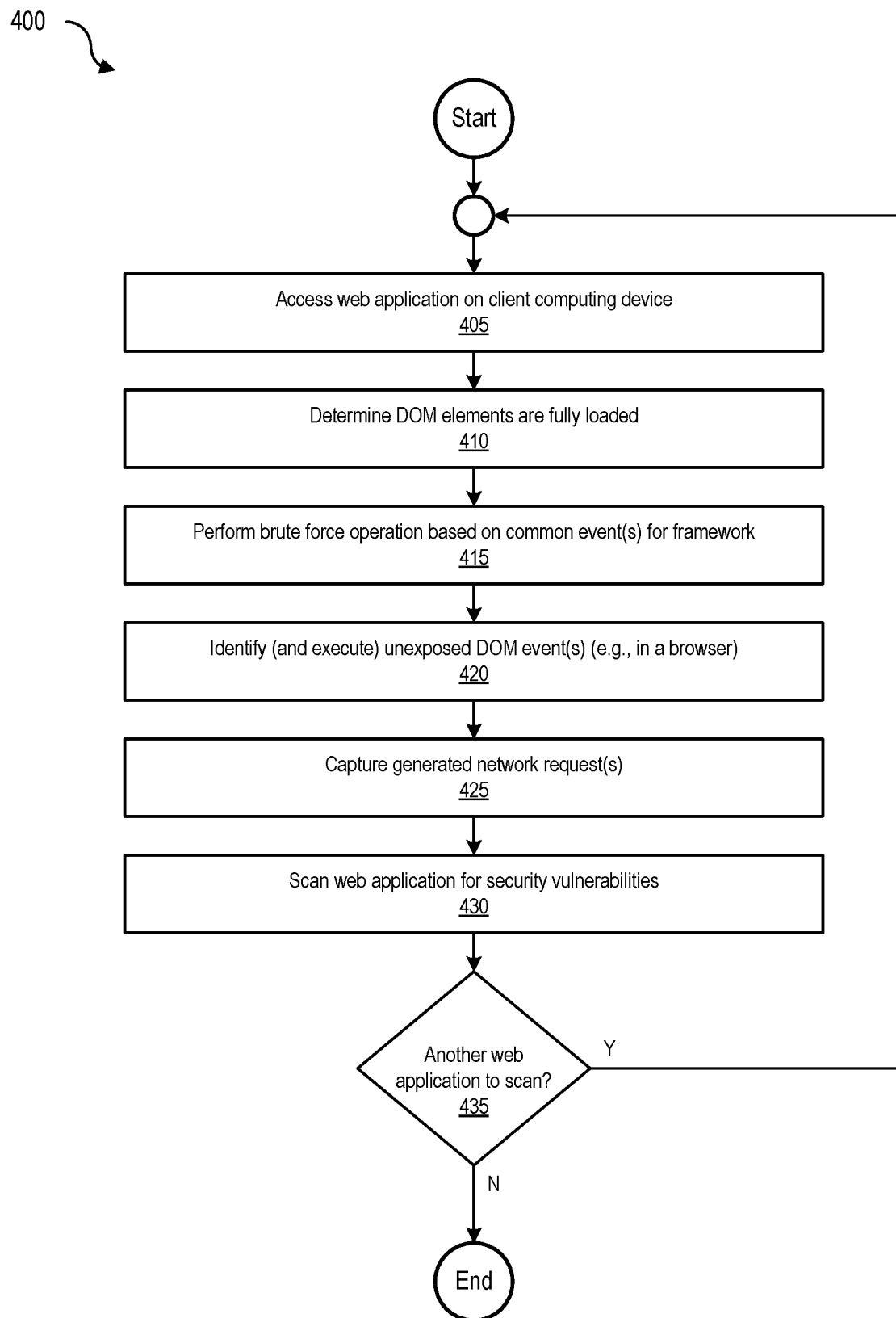
FIG. 4 is a flowchart 400 of a process for scanning a web application for security vulnerabilities, according to one embodiment of the present disclosure.

FIG. 4 is a flowchart 400 of a process for scanning a web application for security vulnerabilities, according to one embodiment. The process begins at 405 by accessing a web application on a client computing device (e.g., web application 145(1) on client 140(1) as shown in FIG. 1). At 410, the process determines that DOM elements are fully loaded (e.g., accounting for the fact that DOM events tied to these DOM elements cannot be crawled and attacked if they are not fully loaded). It should be noted that the methods, systems, and processes disclosed herein are not constrained by the reconciliation process between a Virtual DOM and a "real" or "normal" DOM. As long as the DOM elements are fully loaded, application security server 105 can extract unexposed actionable events for subsequent vulnerability scanning processing.

Because a Virtual/Shadow DOM maintains a virtual representation of a user interface (e.g., webpage 205) in memory and synchronizes this virtual representation with a real/normal DOM (e.g., using a library such as ReactDOM), this aforementioned reconciliation process involves using DOM APIs to find elements to update, creation of new elements, addition of attributes and content, and the final updating of the DOM elements themselves. However, as previously noted, as long as the DOM elements are fully loaded, the subsequent need for reconciliation does not constrain extraction engine 110 from extracting DOM events of DOM elements for subsequent vulnerability scanning by web application security engine 125.

At 415, the process performs a brute force operation based on common event(s) for (the given) framework (e.g., common, frequently used, and/or commonly encountered unexposed actionable events determined by a software developer, a cybersecurity analyst, a software community, historical data, and the like). At 420, the process identifies (and executes) unexposed DOM event(s) (e.g., in a browser—as shown in FIG. 2). At 425, the process captures generated network request(s), and at 430, scans the web application for security vulnerabilities. At 435, the process determines if there is another web application scan. If there is another web application to scan, the process loops to 405. Otherwise, the process ends.

Figure 5:
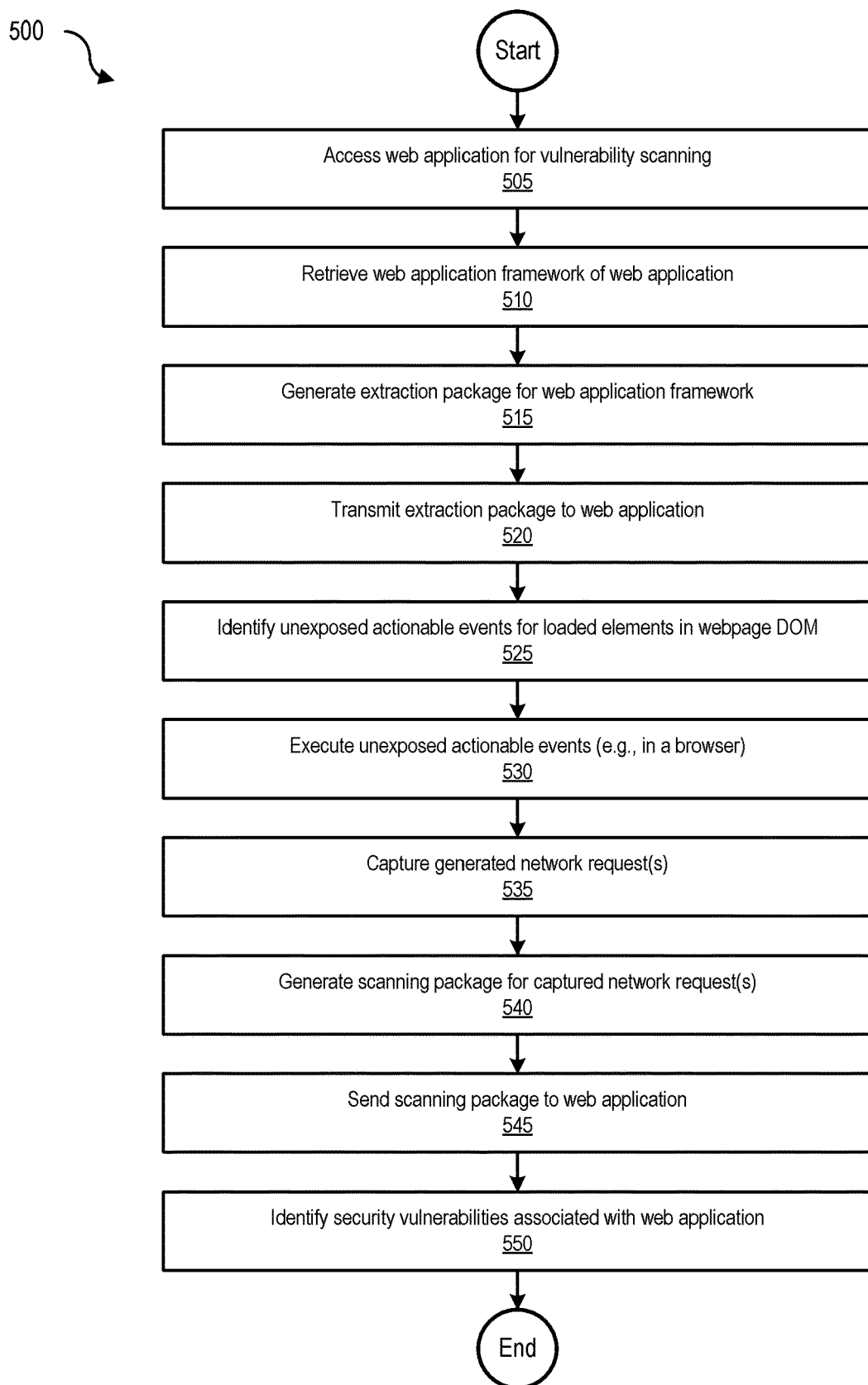
FIG. 5 is a flowchart 500 of a process for identifying security vulnerabilities associated with a web application, according to one embodiment of the present disclosure.

FIG. 5 is a flowchart 500 of a process for identifying security vulnerabilities associated with a web application, according to one embodiment. The process begins at 505 by accessing a web application for vulnerability scanning. At 510, the process retrieves a web application framework of the web application (e.g., React.js, Vue.js, and the like). At 515, the process generates an extraction package for the web application framework (e.g., to request and receive the identity of the web application framework and associated metadata—as performed by extraction manager 130 shown in FIG. 2).

At 520, the process transmits the extraction package to the web application (e.g., extraction package 220). At 525, extraction package 220 identifies unexposed actionable events for (fully) loaded elements in (the) webpage DOM (e.g., webpage 205), and at 530, executes the unexposed actionable events (e.g., in a browser). It should be noted that web application scanners require access to elements and their events in the DOM (including runtime generated elements of the web application) for crawling and vulnerability hunting.

Therefore, at 535, the process captures generated network request(s) (generated by the execution of the unexposed actionable events in step 530), and at 540, generates a scanning package for the captured network request(s). At 545, the process sends (transmits) the scanning package (e.g., scanning package 230) to the web application and ends at 550 by identifying security vulnerabilities associated with the web application. Because vulnerability scanner 135 has access to elements and their events in the DOM (including runtime generated elements of the web application), web application security engine 125 can readily crawl and attack the captured network requests in the web application for security vulnerabilities.

Figure 6:
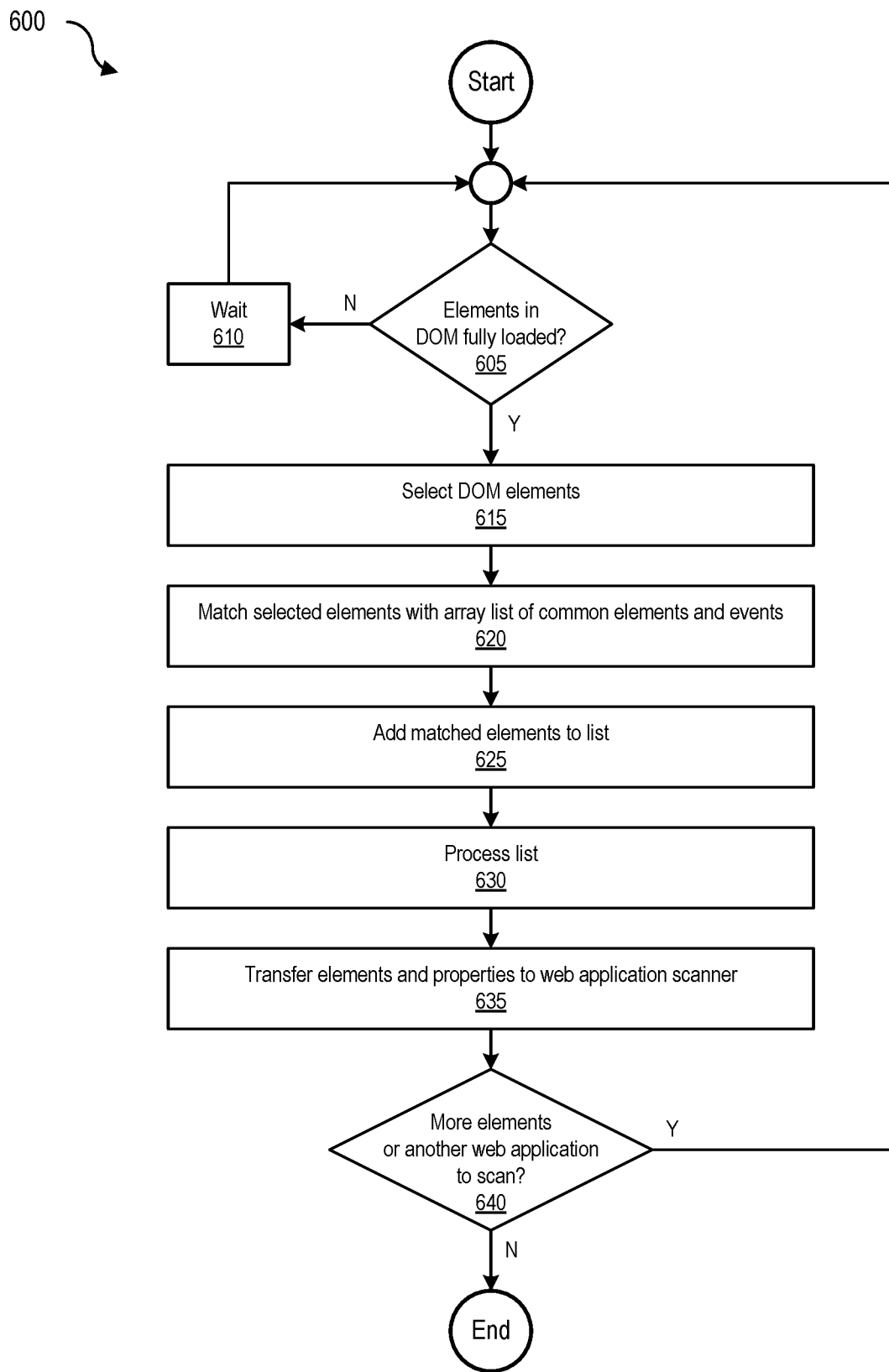
FIG. 6 is a flowchart 600 of a process for transferring document object model (DOM) elements to a web application scanner, according to one embodiment of the present disclosure.

FIG. 6 is a flowchart 600 of a process for transferring document object model (DOM) elements to a web application scanner (e.g., vulnerability scanner 135), according to one embodiment. The process begins at 605 by determining whether elements in a DOM are fully loaded. If the elements in the DOM are not fully loaded, the process, at 610, waits. However, if the elements in the DOM are fully loaded, the process, at 615, selects the DOM elements, and at 620, matches the selected elements with an array list of common elements and events.

At 625, the process adds the matched elements to a list, and at 630, processes the list. At 635, the process transfers elements and properties to a web application scanner (e.g., vulnerability scanner 135). At 640, the process determines whether more elements or another web application have to be scanned. If more elements or another web application have to be scanned, the process loops to 605. Otherwise, the process ends.

Example of Scanning Unexposed Web Applications for Vulnerabilities

Figure 7:
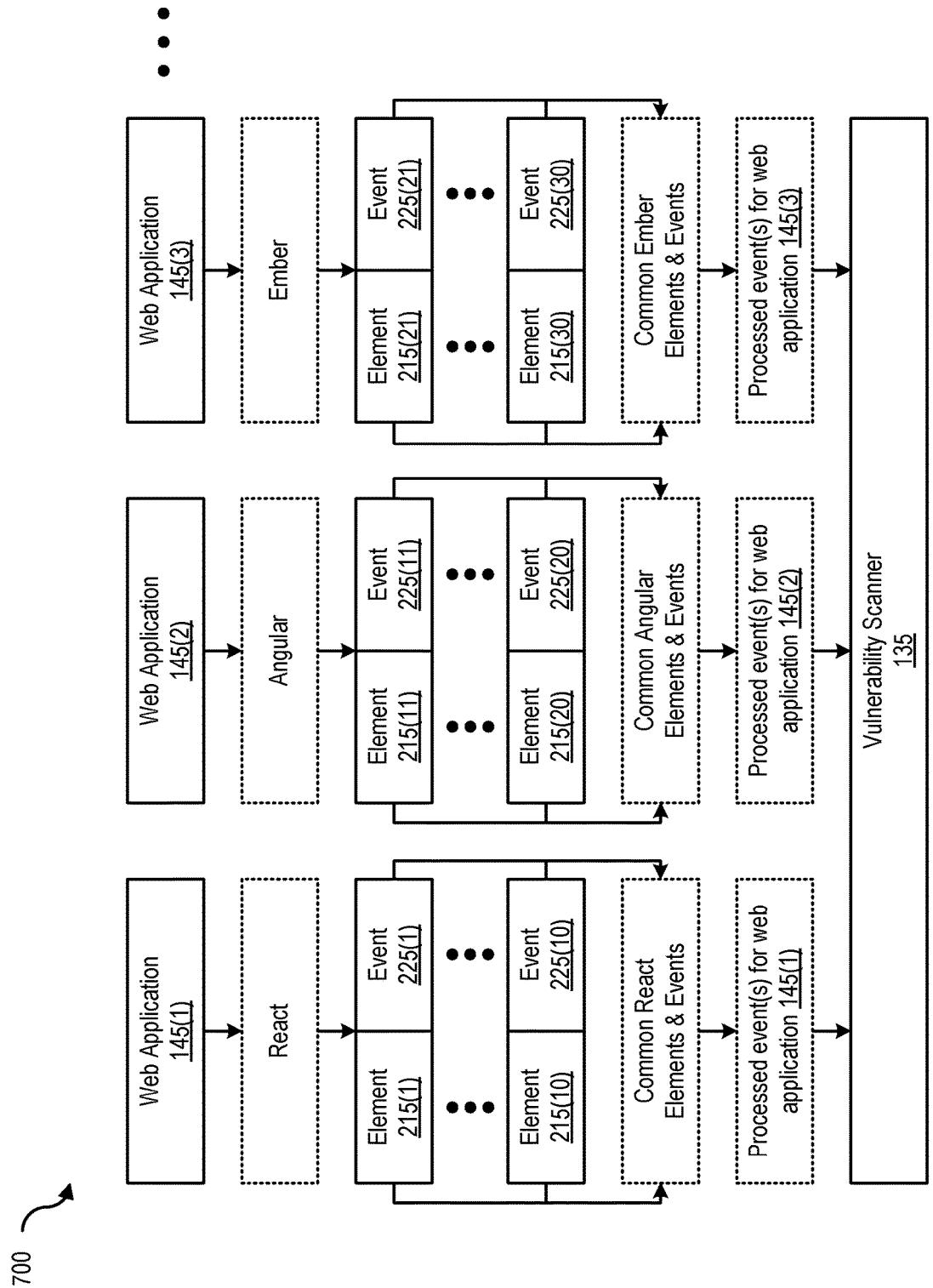
FIG. 7 is a block diagram 700 of a vulnerability scanner that scans unexposed web applications for vulnerabilities, according to one embodiment of the present disclosure.

FIG. 7 is a block diagram 700 of a vulnerability scanner that scans unexposed web applications for vulnerabilities, according to one embodiment. As noted, web application scanners like vulnerability scanner 135 require access to elements and their events in a DOM, including runtime generated elements of a web application for crawling and vulnerability hunting. Existing web application scanning technologies retrieve a DOM from a browser's host and generate XPath from the DOM elements for processing DOM events to analyze network calls like Representational State Transfer (REST) APIs for possible vulnerabilities. However, this existing approach is not optimal for several reasons—particularly for applications developed using disparate JavaScript or other software development frameworks (that do not expose actionable events).

For instance, among other shortcomings, the web application scanner does not have intelligence about the software development framework and also receives the DOM data before the software development framework code is executed. The web application scanner is not privy to the entirety of the DOM and the attached DOM events because the DOM elements are generated when the framework's code is executed. Therefore, under current operational methodologies, the web application scanner uses a traditional click event for attacking vulnerabilities by clicking through the DOM elements for identifying (and finding) network traffic. Unfortunately, clicking through the DOM elements without having adequate insight into the DOM elements is not only time consuming but also dramatically decreases the performance of the crawler. Consequently, without having access to the entire DOM and the corresponding DOM elements (and prior to the methods, systems, and processes disclosed herein), scanners like vulnerability scanner 135 were unable to offer full coverage to users when scanning a web application built with a particular JavaScript (or other software development) framework.

Technology-based disadvantages of click-through crawling for attacking include but are not limited to: (1) poor visibility of DOM elements (e.g., because DOM elements are generated at runtime from the Shadow DOM or through a state change), (2) receiving of the DOM by the web application scanner significantly before the DOM is ready, and (3) performance degradation (e.g., caused by clicking through the DOM elements without having insight (e.g., associated DOM event-related details) about the DOM elements).

Therefore, as noted, to access available DOM elements and their properties (e.g., DOM events), the traditional/existing method(s) discussed above rely on executing click events on the available DOM elements which a scan engine extracts from a website's DOM (e.g., DOM 210 of webpage 205 as shown in FIG. 2). For one, this foregoing process is performed significantly before the DOM finishes loading (e.g., because of limitations of browser APIs used by existing web application scanners). In addition, in terms of further shortcomings, the runtime generated DOM is not available to a scan engine (e.g., extraction engine 110) because a browser's interface passes data to the scanning software before the DOM is ready, the DOM elements are generated after the DOM is ready (preventing the web application scanner from identifying the available DOM elements), and the DOM elements have various extraneous DOM events attached to them (in addition to the click event).

Below is an example embodiment of the data web application security engine 125 uses to build from DOM 210 (e.g.,)(Paths with click events):

'xpath=/BODY/DIV/DIV/APP-ROOT/HOME-MAIN/
    JUMBOTRON-MAIN-PAGE/DIV[2]/FOOTER-
    DATA/FOOTER/DIV/DIV/DIV[1]/UL/LI[3]/A,
    onclick, −1'
'xpath=/BODY/DIV/DIV/APP-ROOT/HOME-MAIN/
    JUMBOTRON-MAIN-PAGE/DIV[2]/FOOTER-
    DATA/FOOTER/DIV/DIV/DIV[1]/UL/LI[2]/A,
    onclick, −1'
'xpath=/BODY/DIV/DIV/APP-ROOT/HOME-MAIN/
    JUMBOTRON-MAIN-PAGE/DIV[2]/FOOTER-
    DATA/FOOTER/DIV/DIV/DIV[1]/UL/LI[1]/A,
    onclick, −1'
'xpath=/BODY/DIV/DIV/APP-ROOT/HOME-MAIN/
    JUMBOTRON-MAIN-PAGE/DIV[2]/FOOTER-
    DATA/FOOTER/DIV/DIV/DIV[1]/UL/LI/A, onclick,
    −1'

In one embodiment, for extracting the non-exposed (on unexposed) data from the DOM elements, extraction engine 110 extracts extraction package 220 into website 205 that web application security engine 125 is crawling. Extraction package 220 waits until DOM 210 is ready for processing the DOM elements (e.g., elements 215(1)-(N)) so as to include the runtime generated DOM for processing. In this example, waiting for DOM 210 to finish loading can be accomplished by a jQuery JavaScript library DOM polling technique:

//jQuery DOM Polling
    this.JQ(document).ready(( )=>{
      //dom is ready
    }
    });

After DOM 210 is ready (e.g., fully loaded), DOM elements 215(1)-(N) are selected using, for example, the getElementsByTagName( ) function of JavaScript (e.g., Pseudo code: var elements=document.getElementsByTagName ('*')). In one embodiment, after selecting the DOM elements by their HTML tag name, the selected elements and their tag names are matched with a curated array list of commonly used HTML elements and their event names (e.g., commonly used by software developers). The foregoing process can be accomplished by an array search operation, which may be more preferable than clicking through the elements without having relevant information about the DOM. Below is example pseudo code for a common elements and events list generated by elements manager 115 and events manager 120:

```
Events={
a: {events: ['onclick']},
button: {events: ['onclick']},
select: {events: ['onchange']},
image: {events: ['onclick']},
textarea: {
events: [
   'onchange',
   'onkeydown'
]
},
div: {
events: [
   'onclick',
   'onkeydown',
   'onmousedown'
]
}
span: {
events: [
   'onclick',
   'onkeydown',
   'onmousedown'
]
}
input: [
{attribute: 'text', events: ['onchange', 'onkeydown', 'onmouseenter']},
{attribute: 'password', events: ['onchange', 'onkeydown', 'onmouseenter']},
{attribute: 'button', events: ['onclick', 'onmouseenter']},
{attribute: 'radio', events: ['onclick', 'onmouseenter']},
{attribute: 'submit', events: ['onclick', 'onmouseenter']},
{attribute: 'reset', events: ['onclick', 'onmouseenter']},
{attribute: 'search', events: ['onchange', 'onkeydown', 'onmouseenter', 'onclick']},
{attribute: 'tel', events: ['onchange', 'onkeydown', 'onmouseenter', 'onclick']},
{attribute: 'time', events: ['onchange', 'onkeydown', 'onmouseenter', 'onclick']},
{attribute: 'url', events: ['onchange', 'onkeydown', 'onmouseenter', 'onclick']},
{attribute: 'week', events: ['onchange', 'onkeydown', 'onmouseenter', 'onclick']},
{attribute: 'range', events: ['onchange', 'onkeydown', 'onclick']}
]
};
```

In one embodiment, the matched DOM elements and their DOM events are added to a list for extracting more information about the element from the DOM. Below is pseudo code for generating an example sample list:

```
list=[
element: 'span',
events: [
   'oneclick',
   'onkeydown',
   'onmousedown'
]
]
```

In one embodiment, the list is further processed and information like XPath (e.g., location of the element in the DOM), the element, the event, and the index of the element are attached to the corresponding element in the list. In this example, the index is used for certain elements (e.g., like select) because of the existence of child elements in the parent element, permitting vulnerability scanner 135 to access the child elements separately. After the foregoing list processing, the elements and their properties collected from this process are transferred to vulnerability scanner 135. For example, the foregoing transfer can be performed using a JavaScript object, an example of which is shown below:

0: {location: "/BODY/DIV/DIV/NAV/A", element: a.navbar-brand, event: "onclick", index: −1}
1: {location: "/BODY/DIV/DIV/NAV/A[1]", element: a.navbar-brand, event: "onclick", index: −1}
2: {location: "/BODY/DIV/DIV/NAV/A[2]", element: a.navbar-brand, event: "onclick", index: −1}
3: {location: "/BODY/DIV/DIV/NAV/A[3]", element: a.navbar-brand, event: "onclick", index: −1}
4: {location: "/BODY/DIV/DIV/NAV/A[4]", element: a.navbar-brand, event: "onclick", index: −1}
5: {location: "/BODY/DIV/DIV/NAV/DIV", element: div, event: "onclick", index: −1}
6: {location: "BODY/DIV/DIV/NAV/DIV", element: div, event: "onkeydown", index: −1}

In certain embodiments, extraction package 220 (e.g., a scan engine) executes events in a browser by using the location (e.g., XPath) of the DOM element and records the network calls (e.g., REST APIs, and the like), as shown in FIG. 2. Vulnerability scanner 135 then generates scanning package 230 for the captured network calls to efficiently scan, crawl, and attack for security vulnerabilities. Therefore, the systems, methods, and processes disclosed and described herein offer several advantages for scanning unexposed web applications for vulnerabilities, including but not limited to: (1) improved performance, (2) provision of visibility into a runtime generated DOM, (3) increase of coverage of a vulnerability scanner, and (4) provision of rich and detailed insight with respect to elements in a Shadow/Virtual DOM.

Example of Enhanced Crawling of Web Applications of Disparate Frameworks

As noted, web application vulnerability scanning requires discovery and crawling of a web application prior to running tests designed to identify security-based vulnerabilities in the web application. Therefore, it is critical that web application discovery be thorough and comprehensive. If a section of the web application or even the whole web application is not discovered and crawled, the (given) section can remain hidden from vulnerability checking and the section may not be tested for security-related problems. Consequently, the comprehensive enumeration of entry points into a web application is a necessary requirement for effective and complete web security analysis of the target web application.

It will be appreciated that web development technologies have been evolving rapidly for several years. One noticeable innovation in web application design is the proliferation of JavaScript frameworks. Each JavaScript framework is unique and has its own feature sets. Examples of such frameworks, as previously noted, include React, Angular, Knockout, Vue, and Ember. Because such frameworks introduce additional complexity on top of and in addition to traditional web application design techniques, conventional methodologies of web application discovery are ill suited to crawl such web applications.

In one embodiment, an injection of custom framework hooks into web pages loaded in a browser to enumerate entry points into a disparate framework-based web application ensures effective crawling by a vulnerability scanner. In this example, a scan engine performs framework detection on the response and any external scripts included with the response. The custom framework hook injected is specific to the software development framework used by the particular web application detected, permitting direct interaction with the framework(s) used. The foregoing technique allows for a thorough and accurate crawl of a web application, particularly when compared with more generic (or traditional) approaches.

Existing web application vulnerability scanning techniques involve discovering and crawling web application access points. Given starting seed Uniform Resource Locators (URLs) and/or requests, requests are made to a target web application and responses are received. The responses are parsed and analyzed and new and unknown web application access points such as other URLs, forms, web application APIs, and the like, are discovered.

Discovered access points are then collected and placed in a crawl queue (e.g., by a crawler). The crawl queue can be sorted based on multiple parameters such as uniqueness of the URL, similarity of the URL to previously crawled/discovered URLs, as well as URLs already inserted into the queue. The access points are then taken from the queue (e.g., by the crawler) and requests are generated and sent to the web application. The responses from the web application are parsed and analyzed to identify further access points. These further identified access points are fed back into the crawl queue, and the process repeats.

It should be noted that the responses from the web application can have different content types (e.g., HTML, JavaScript, stylesheet, binary (images), and the like). When a web browser (e.g., Google Chrome, Mozilla Firefox, Microsoft Internet Explorer, Safari, and the like) loads an HTML response into a viewer, the web browser loads the static HTML content and creates a Document Object Model (DOM) of the web document. The browser then loads and executes embedded or linked content (e.g., JavaScript content) that may update the DOM.

Consequently, the web page that is presented to the user includes a mixture or combination of static and dynamic content. The crawler uses separate engines to discover static and dynamic content—the HTML parser for static content and the (web) browser for dynamic content. The crawler loads the response in the browser and the browser loads and recreates the dynamic content. The crawler then accesses the DOM provided by the browser and enumerates the HTML elements and becomes aware of the dynamic content on the webpage.

For example, the crawler sends requests and receives responses from a web application. Responses with an HTML content type are loaded in the embedded browser for additional processing. A response selected for such processing is loaded in the browser along with a custom generic script (e.g., JavaScript) which enumerates the HTML elements and attached events in the loaded DOM. Examples of events include onclick, onselect, onload, onsubmit, and the like.

The crawler collects elements with attached events and adds them to a queue for further analysis. When a scheduled event is sent for analysis, the crawler reloads the response in the browser and then executes the event that requires analysis (e.g., attacking identified network calls for vulnerability checking/scanning). If event execution results in a new request to the web application, the request is intercepted and added to the scan request collection.

After event execution, the updated DOM is enumerated again in order to discover DOM modifications that may have resulted from the event. The newly discovered events are then added to the browser analysis queue. The crawler keeps executing events from the browser event queue until recorded events are exhausted or until scan configuration limits are met. In some embodiments, examples of scan configuration limits include: maximum crawled links limit, maximum scan time, maximum number of events to try on one response, and the like.

Modern software development frameworks (e.g., JavaScript frameworks such as Angular, React, and the like) permit the building of web applications that consist entirely of dynamic content. The data that is used to build and populate webpages is downloaded from a server asynchronously and the webpage DOM is constructed using this data. Certain frameworks create a separate and hidden presentation of the (original) DOM that exists entirely in runtime: the Virtual or Shadow DOM.

Unfortunately, a Shadow DOM presents a technology-related problem for scan engines (e.g., web application security engine 15) and crawlers in web application (vulnerability) scanners because each framework includes its own version of the Shadow DOM and the browser DOM does not reference the Shadow DOM. The crawler design that discovers dynamic content by interacting with the browser DOM directly cannot retrieve the correct representation of HTML elements and their state, and thus cannot (always) correctly interact with HTML controls.

Further, when the crawler interacts with HTML controls, the Shadow DOM and the framework can get out of synchronization, resulting in incorrect website behavior. Each HTML element has two representations and two states: one within the browser DOM space and the other within the framework memory (e.g., JavaScript memory). When the framework needs to update an HTML element or execute an action on the HTML element, the framework updates the wrapper object state and instructions the object to execute the particular action. Such a dual structure is problematic for existing crawler engine design. Traditional crawlers communicate directly with HTML elements through the browser (or through custom framework scripts). However, because HTML elements created by a disparate framework (e.g., a JavaScript framework) may have an outdated or incomplete property set and values, the direct communication results in an incomplete or wrong view of the HTML elements and the events they can execute.

Therefore, in one embodiment, information associated with disparate software development frameworks is introduced into the crawling architecture. In this example, a scan engine can interact with a web browser through a given framework (or multiple frameworks) present on a given webpage. In some embodiments, a custom framework 'hook' file with classes that can connect to a framework and interact with the framework is provided for each supported framework. In this example, each hook exposes a standard interface that a crawler can communicate with. It will be appreciated that this process allows for a translation of framework-specific objects and events into standard DOM frameworks and events that the crawler can consume (e.g., for application vulnerability crawling and scanning, among other uses).

In one embodiment, a crawler (e.g., a software program that scans websites and reads webpages and associated information to create entries for a search engine index or to unearth network calls for vulnerability scanning/testing, and the like), makes a request and downloads the response. In this example, if the response is an HTML content type, the crawler executes a framework detection routine on the response for each supported framework. The detection is based on regular expressions, but may involve other verification mechanisms.

In certain embodiments, when a supported software development framework is present in a response, the response is loaded in the web browser with the custom framework 'hook' for the target framework injected into the webpage. In this example, a function in the hook script interacts with the framework used to build the webpage to create an enumeration of DOM elements and their event handlers. A delay may be included before execution of this function, on a per framework basis, to ensure the framework has sufficient time in the web browser to fully finish the framework setup procedures.

In some embodiments, the foregoing list (of elements and events) is transmitted to the crawler for further processing. The crawler (e.g., extraction engine 110) creates and maintains a global list of elements and events seen on a given webpage as well as the remaining webpages of the web application. In this example, this global list can be used to determine and/or decide which DOM events need to be executed in order (e.g., in a sequential order) to explore and discover the web application functionality, including the discovery of new URLs, new web application states, and generation of new requests in the web application.

In other embodiments, the crawler decides which DOM events need to be tried based on multiple criteria, including, but not limited to, the uniqueness of elements and events (e.g., within a given page as well as the whole/entire scope of the scan), and repetition tolerance configuration values. The crawler then takes the next DOM event that the crawler needs to execute, loads the original page in the browser (e.g., as shown in FIG. 2), executes the DOM events, and records browser network activity (e.g., network calls, network requests, and the like) that occur during event execution. The requests and responses are recorded/stored and passed through the crawler for processing (e.g., new links and request discovery).

In certain embodiments, after event execution, the crawler retrieves the updated list of DOM elements and events from the framework hook (e.g., a JavaScript hook) and adds newly discovered event(s) to the DOM events queue for further processing. In this example, the DOM discovery loop continues until the remaining events are processed or scan configuration reaches a limit (e.g., maximum DOM events per page, maximum DOM events from an element with a specific name and identifier, and the like).

Example Computing Environment

Figure 8:
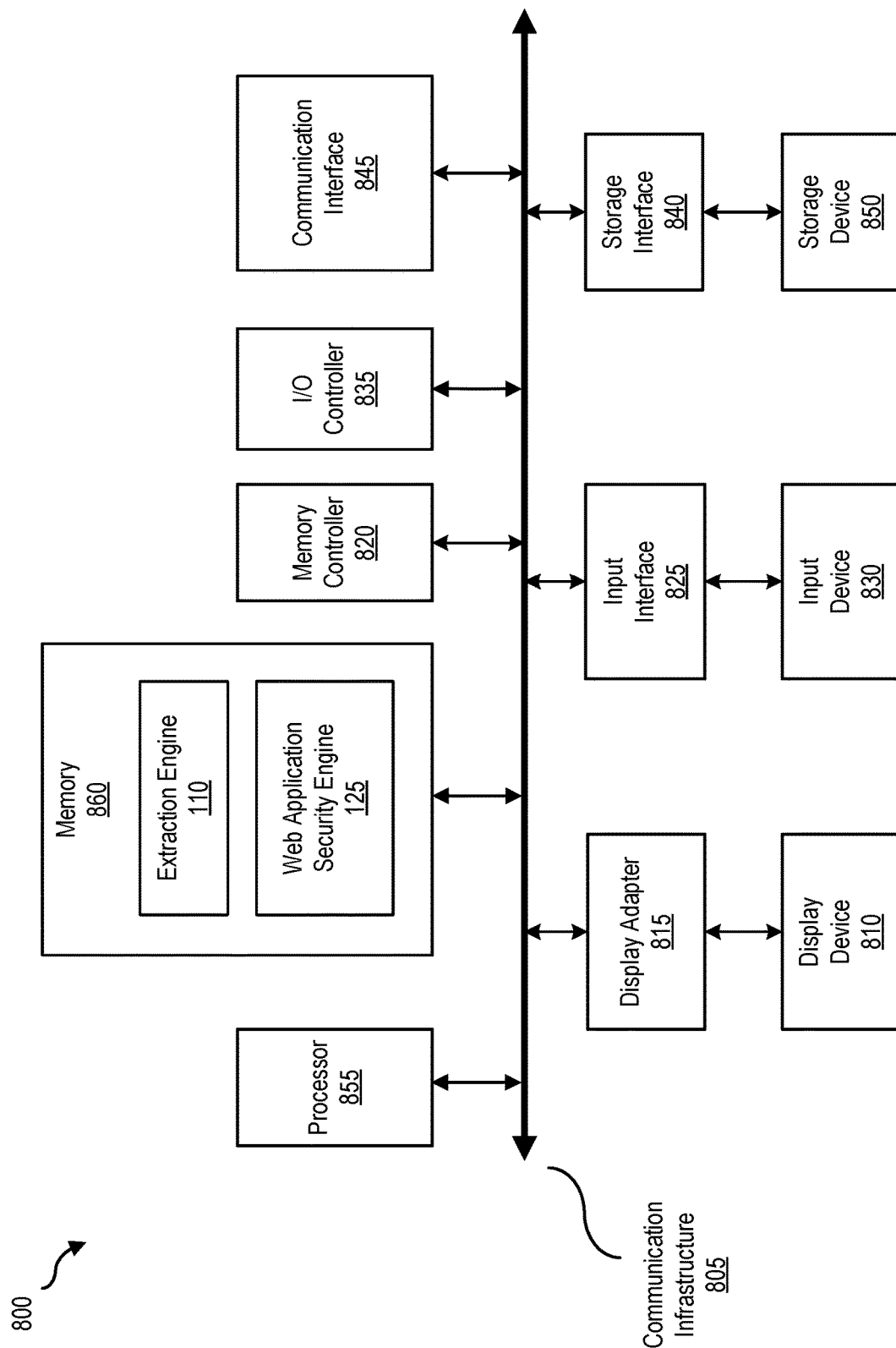
FIG. 8 is a block diagram 800 of a computing system, illustrating an extraction engine and a web application security engine, according to one embodiment of the present disclosure.

FIG. 8 is a block diagram 800 of a computing system, illustrating how an extraction engine and/or a web application security engine can be implemented in software, according to one embodiment. Computing system 800 can include application security server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes extraction engine 110 (e.g., a crawler) and/or web application security engine 125 (e.g., a scanner), computing system 800 becomes a special purpose computing device that is configured to perform enhanced scanning and crawling of unexposed web applications built with disparate software development frameworks (e.g., JavaScript frameworks, and the like).

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing extraction engine 110 and/or web application security engine 125 (and associated trained machine learning models) may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware, or via a machine learning model (e.g., to perform enhanced scanning and crawling of unexposed web applications built with disparate software development frameworks).

Example Networking Environment

Figure 9:
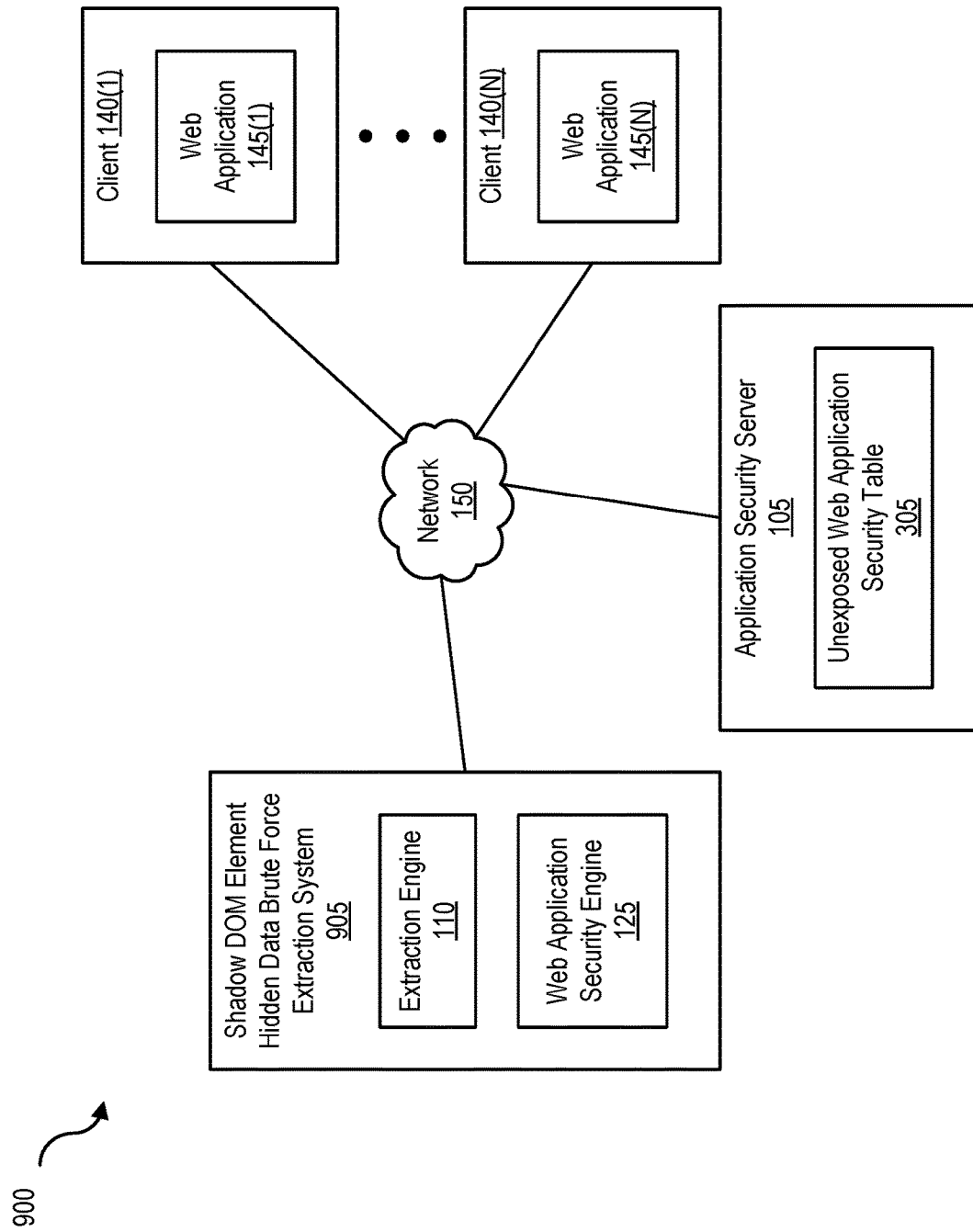
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 150 generally represents any type or form of computer network or architecture capable of facilitating communication between application security server 105 and clients 140(1)-(N). For example, network 150 can be a Wide Area Network (WAN) (e.g., the Internet), a Storage Area Network (SAN), or a Local Area Network (LAN).

Extraction engine 110 and/or web application security engine 125 may be part of application security server 105, or may be separate. All or a portion of embodiments may be encoded as a computer program and loaded onto, stored, and/or executed by extraction engine 110 and/or web application security engine 125, and distributed over network 150.

In some examples, all or a portion of shadow DOM element hidden data brute force extraction system 905 and/or application security server 105 may represent portions of a cloud-computing or network-based environment. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, extraction engine 110 and/or web application security engine 125 may transform the behavior of application security server 105 to scan and crawl unexposed web applications created using disparate frameworks.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

Example Crawler for Enhanced Web Application Crawling

Figure 10:
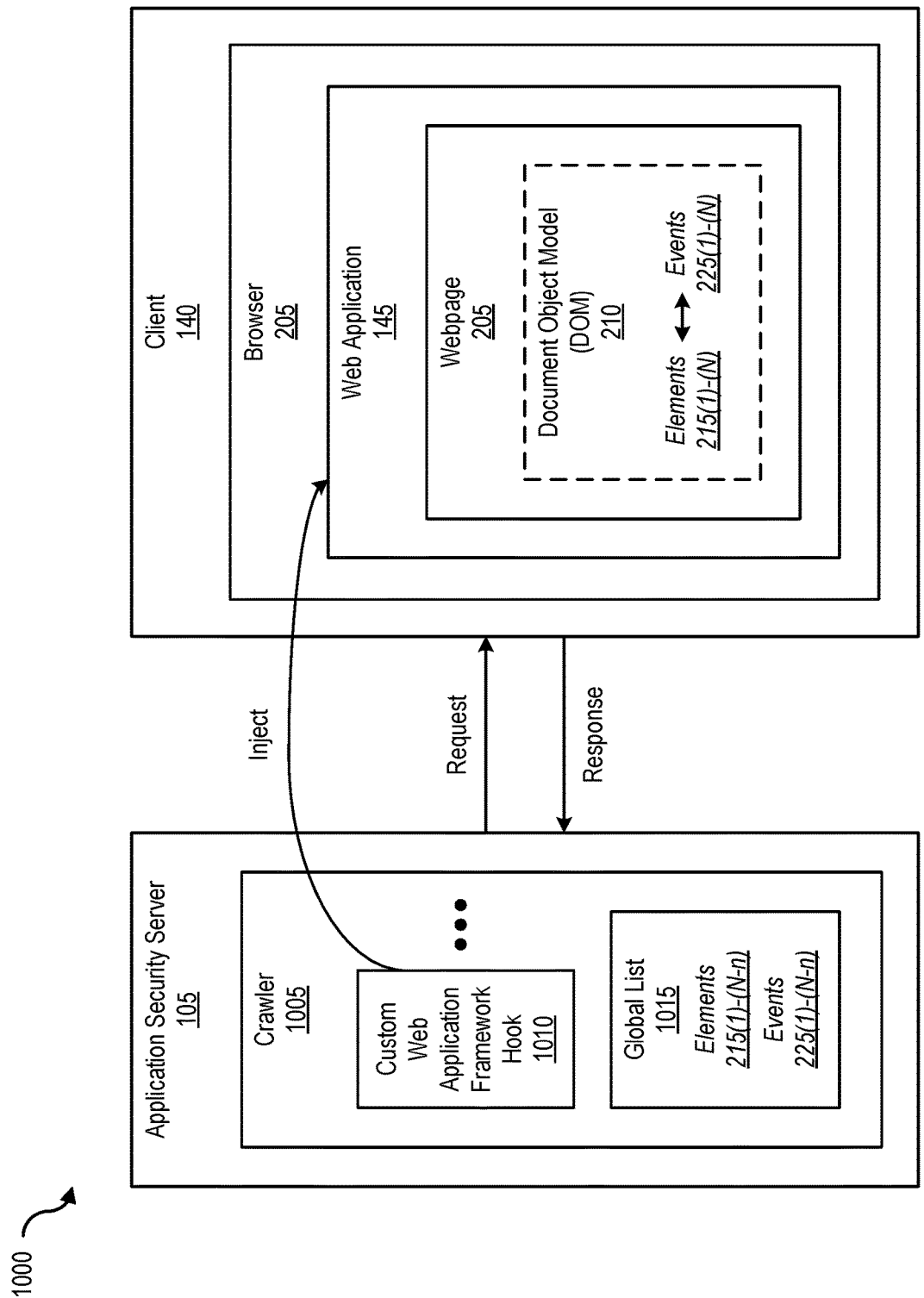
FIG. 10 is a block diagram that 1000 of a crawler that injects a custom web application framework hook, according to one embodiment of the present disclosure.

FIG. 10 is a block diagram that 1000 of a crawler that injects a custom web application framework hook, according to one embodiment. In one embodiment, crawler 1005 executes a web application framework detection routine to detect a web application framework associated with a web application 145, injects a custom web application framework hook 1010 for web application 145 generated with the web application framework, receives DOM elements 125 (1)-(N) and DOM events 225(1)-(N), determines one or more DOM events to be executed, executes the one or more DOM events, and records network activity during execution of the one or more DOM events (e.g., requests and responses are recorded and passed through crawler 1005 for processing).

In one embodiment, crawler 1005 receives a response to a request generated to web application 145, determines that the web application framework is part of the response, and loads the response in browser 205 executing web application 145. In another embodiment, custom web application framework hook 1010 for the web application framework is injected into webpage 205 of browser 205 and one or more of DOM events 225(1)-(N) (e.g., DOM events 225(1)-(N-n)) are executed to discover (and explore) functionality of web application 145.

In another embodiment, custom web application framework hook 1010 causes browser 205 to load the response with custom web application framework hook 1010 for the web application framework if the web application framework is part of the response. For example, the response can be a HTML content type and the detection of the web application framework can be based on regular expressions.

In certain embodiments, custom web application framework hook 1010 causes a function in custom web application framework hook 1010 to interact with the web application framework used to build webpage 205 to create an enumeration of DOM elements 215(1)-(N) and DOM events 225(1)-(N), and the function is executed after a delay to ensure setup procedures associated with the web application framework are complete.

In some embodiments, crawler 1005 creates and maintains a global list 1015 of multiple DOM elements and corresponding DOM events associated with webpage 205 and identifies, using global list 1015, an order in which to execute one or more DOM events of multiple DOM events to discover the functionality of web application 145. In other embodiments, discovering the functionality of web application 145 includes discovering new URLs, new web application states, and generation of new requests in web application 145 and the execution of the one or more DOM events (e.g., events 225(1)-(N-n)) is based on one or more criteria comprising at least a uniqueness of the DOM elements and the DOM events and one or more repetition tolerance configuration values (e.g., based on the time required to perform security operations based on vulnerabilities associated with web application 145 that have already been discovered, the computing environment in which web application 145 is implemented, and the like).

In certain embodiments, crawler 1005 retrieves an updated list of DOM elements and DOM events from custom web application framework hook 1010 after executing one or more DOM events, adds the new DOM events to a DOM events queue for processing, and performs a DOM discovery loop until one or more remaining DOM events are processed or a scan configuration limit is reached.

Example of Existing Web Application Crawling Configurations and Limitations

Figure 11:
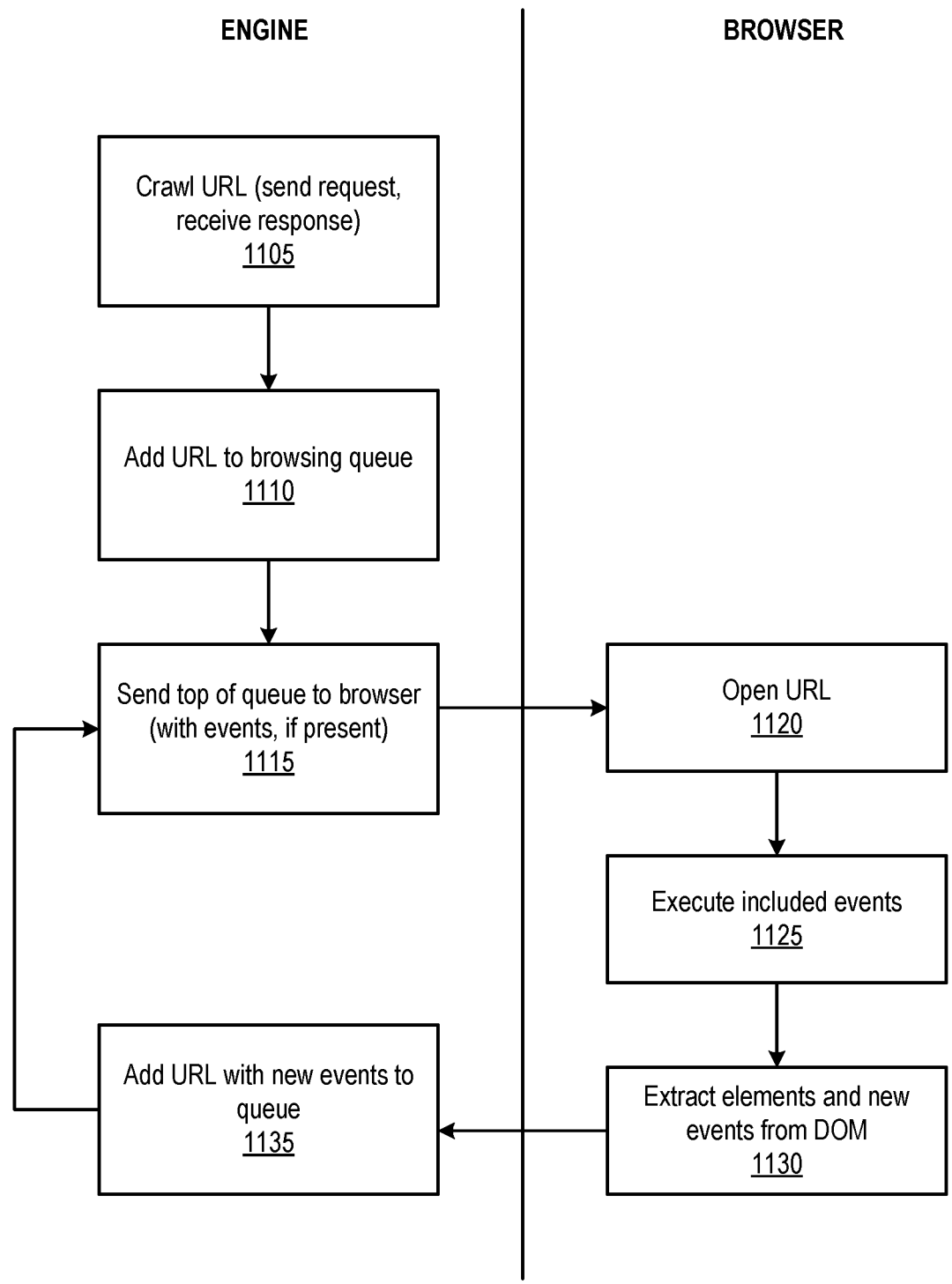
FIG. 11 is a flowchart 1100 of an existing web application crawling process.

FIG. 11 is a flowchart 1100 of an existing web application crawling process and is considered prior art. The process begins at 1105 by crawling a URL (e.g., sending a request and receiving a response) and at 1110 adds the URL to a browsing queue. At 1115, the process sends the top of the queue to a browser (e.g., with events, if present).

At 1120, the browser opens the URL and at 1125 executes the included events. At 1130 the browser extracts elements and new events from the DOM and sends the elements and the new events to an engine (e.g., crawler 1005 that can be part of a scanning engine). At 1135 the (scanning) engine adds the URL with the new events to the queue and performs a DOM discovery loop (as shown in FIG. 11).

Unfortunately, existing web application vulnerability scanning engines (as shown in FIG. 11) cannot accurately crawl unexposed web application built with modern web application frameworks for security vulnerabilities because the technology-related complications caused by the asynchronous rendering capabilities afforded by such modern web application frameworks discussed herein (which, are albeit, useful for a seamless web browsing experience), render existing web application scanning engines (e.g., scanners and crawlers) inadept at accurately discovering and examining runtime generated DOM events.

Example of an Enhanced Web Application Crawling Process

Figure 12:
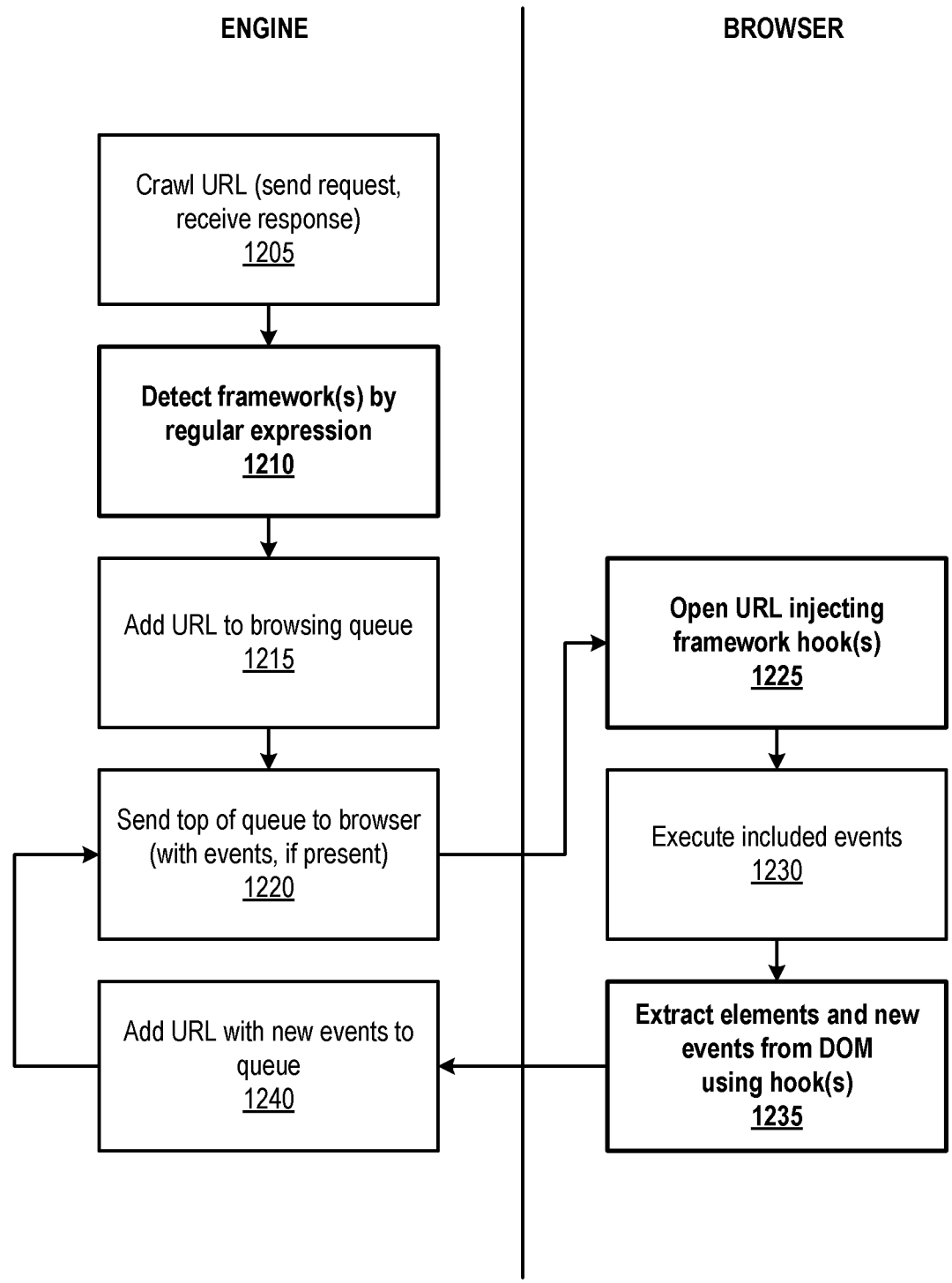
FIG. 12 is a flowchart 1200 of an enhanced crawling process, according to one embodiment of the present disclosure.

FIG. 12 is a flowchart 1200 of an enhanced crawling process, according to one embodiment. The process beings at 1205 by crawling a URL (e.g., sending a request and receiving a response). At 1210, and in one embodiment, the process detects framework(s) by regular expression (or another verification mechanism). At 1215, the process adds the URL to the browsing queue, and at 1220 sends the top of the queue to a browser (with events, if present).

At 1225, the browser opens the URL and injects the framework hook(s), and at 1230 executes the included events. At 1235, the browser extracts elements and new events from the DOM using (the) hook(s). At 1240, the engine adds the URL with the new events to the queue and ends at 1220 by performing a DOM discovery loop (e.g., until one or more remaining DOM events are processed or a scan configuration limit is reached).

Figure 13:
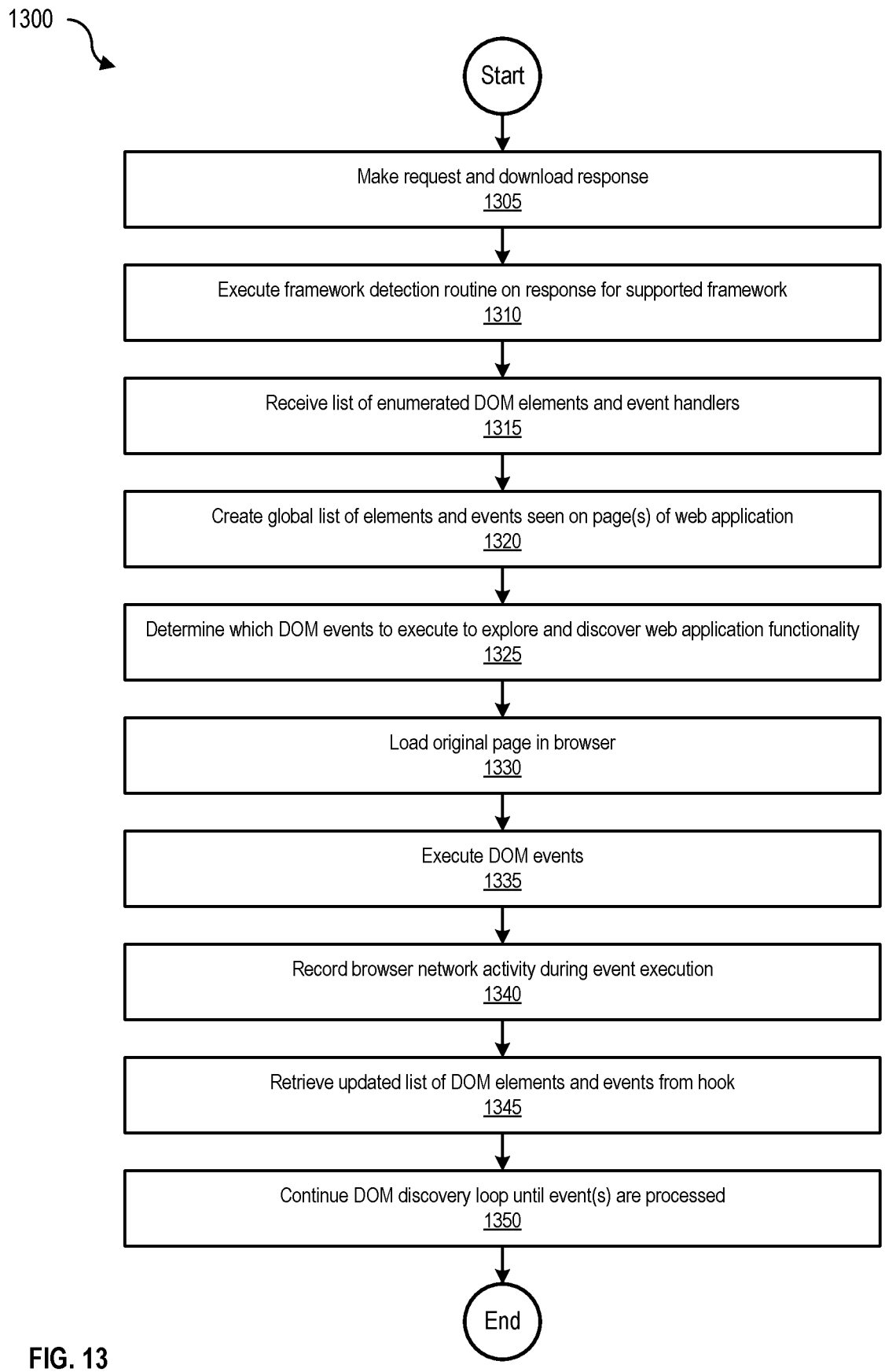
FIG. 13 is a flowchart 1300 of an enhanced crawling process of an unexposed web application, according to one embodiment of the present disclosure.

FIG. 13 is a flowchart 1300 of an enhanced crawling process of an unexposed web application, according to one embodiment. The process begins at 1305 by making a requesting a downloading a response, and at 1310, executes a framework detection routine on the response for the supported framework. At 1315, the process receives a list of enumerated DOM elements and event handlers.

At 1320, the process creates a global list of elements and events seen on web pages of the web application, and at 1325, determines which DOM events to execute to explore and discover web application functionality. At 1330, the process loads the original page in the browser, and at 1335, executes the DOM events.

At 1340, the process records browser network activity during event execution, and at 1345, retrieves an updated list of DOM elements and events from the hook. The process ends at 1350 by a continuing DOM discovery loop until event(s) are processed.

Therefore, by introducing information about web application frameworks into the crawling architecture, a scanning engine can interact with a browser through the web application framework(s) present on a given webpage. For example, in certain embodiments, for each supported framework, a custom 'hook' file with classes that can connect to the web application framework interact with the web application framework. In these examples, each 'hook' exposes a standard interface that a crawler can communicate with. Consequently, the foregoing systems, methods, and processes permit a translation of framework-specific objects and events into standard DOM frameworks and events that the crawler can consume.

It will be appreciated that injecting custom web application framework-specific code into webpages loaded in a browser to accurately enumerate entry points into a web application framework-based web application ensures thorough crawling by a vulnerability scanner. The systems, methods, and processed described and disclosed herein permit a scan engine to perform framework detection on a response and external scripts included with the response. In such examples, the code injected is specific to web application framework(s) used by a particular web application detected, permitting direct interaction with the web application framework(s) used—thus permitting a more thorough and accurate crawl of a web application (e.g., compared with other generic and/or alternative approaches).

What is claimed is:

1. A computer-implemented method, comprising:
receiving a web page comprising at least a portion of a web application, wherein the web application is implemented using a web application framework that maintains a state of Document Object Model (DOM) elements of the web application in framework memory distinct from a DOM space of the web page;
executing a web application framework detection routine on the web page to detect the web application framework associated with the web application;
injecting into the web page a custom web application framework hook for the web application executable to connect to and interact with the web application framework;
executing the custom web application framework hook to retrieve the Document Object Model (DOM) elements and DOM events associated with the DOM elements from the web application framework;
determining one or more of the DOM events to be executed;
executing the one or more DOM events;
recording network activity during execution of the one or more DOM events;
creating a global list of a plurality of DOM elements and a plurality of corresponding DOM events associated with the web page; and
identifying, using the global list, an order in which to execute one or more of the plurality of DOM events to discover functionality of the web application.

2. The computer-implemented method of claim 1, further comprising:
receiving a response to a request generated to the web application;
determining that the web application framework is part of the response; and
loading the response in a web browser executing the web application.

3. The computer-implemented method of claim 2, wherein
the DOM events are executed to discover functionality of the web application.

4. The computer-implemented method of claim 2, wherein
the response is a Hypertext Markup Language (HTML) content type; and
the detection of the web application framework is based on regular expressions.

5. The computer-implemented method of claim 2, wherein
the response is loaded in the web browser with the custom web application framework hook when the web application framework is determined to be part of the response.

6. The computer-implemented method of claim 1, wherein
the custom web application framework hook is executed after a delay to ensure setup procedures associated with the web application framework are complete.

7. The computer-implemented method of claim 6, wherein
discovering the functionality of the web application comprises discovering new Uniform Resource Locators (URLs), new web application states, and generation of new requests in the web application, and
the execution of the one or more DOM events is based on one or more criteria comprising at least a uniqueness of the plurality of DOM elements and the plurality of DOM events and a plurality of repetition tolerance configuration values.

8. The computer-implemented method of claim 7, further comprising:
retrieving an updated list of DOM elements and DOM events from the custom web application framework hook after executing the one or more DOM events; and
adding new DOM events to a DOM events queue for processing.

9. The computer-implemented method of claim 8, further comprising:
performing a DOM discovery loop until one or more remaining DOM events are processed or a scan configuration limit is reached.

10. A system comprising:
one or more processors; and
a memory coupled to the one or more processors, wherein the memory stores program instructions executable by the one or more processors to:
receive a web page comprising at least a portion of a web application, wherein the web application is implemented using a web application framework that maintains a state of Document Object Model (DOM) elements of the web application in framework memory distinct from a DOM space of the web page;
execute a web application framework detection routine on the web page to detect the web application framework associated with the web application;
inject into the web page a custom web application framework hook for the web application executable to connect to and interact with the web application framework;
execute the custom web application framework hook to retrieve the Document Object Model (DOM) elements and DOM events associated with the DOM elements from the web application framework;
determine one or more of the DOM events to be executed;
execute the one or more DOM events;
record network activity during execution of the one or more DOM events;
create a global list of a plurality of DOM elements and a plurality of corresponding DOM events associated with the web page; and
identify, using the global list, an order in which to execute one or more of the plurality of DOM events to discover functionality of the web application.

11. The system of claim 10, wherein the program instructions are executable by the one or more processors to:

receive a response to a request generated to the web application;

determine that the web application framework is part of the response; and load the response in a web browser executing the web application.

12. The system of claim 11, wherein the DOM events are executed to discover functionality of the web application.

13. The system of claim 11, wherein the response is a Hypertext Markup Language (HTML) content type; and the detection of the web application framework is based on regular expressions.

14. The system of claim 11, wherein the response is loaded in the web browser with the custom web application framework hook when the web application framework is determined to be part of the response.

15. The system of claim 10, wherein the custom web application framework hook is executed after a delay to ensure setup procedures associated with the web application framework are complete.

16. The system of claim 15, wherein discovering the functionality of the web application comprises discovering new Uniform Resource Locators (URLs), new web application states, and generation of new requests in the web application, and the execution of the one or more DOM events is based on one or more criteria comprising at least a uniqueness of the plurality of DOM elements and the plurality of DOM events and a plurality of repetition tolerance configuration values.

17. The system of claim 16, wherein the program instructions are executable by the one or more processors to:

retrieve an updated list of DOM elements and DOM events from the custom web application framework hook after executing the one or more DOM events; and adding new DOM events to a DOM events queue for processing.

18. The system of claim 17, wherein the program instructions are executable by the one or more processors to:

performing a DOM discovery loop until one or more remaining DOM events are processed or a scan configuration limit is reached.

* * * * *